US012792412B2

(12) United States Patent
Liu et al.

(10) Patent No.: US 12,792,412 B2
(45) Date of Patent: Nov. 10, 2026

(54) RESOURCE ALLOCATION METHOD, MEDIUM, AND SERVER

(71) Applicant: SHANGHAI JIAO TONG UNIVERSITY, Shanghai (CN)

(72) Inventors: Zihan Liu, Shanghai (CN); Jingwen Leng, Shanghai (CN); Guandong Lu, Shanghai (CN); Quan Chen, Shanghai (CN); Chao Li, Shanghai (CN); Minyi Guo, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 296 days.

(21) Appl. No.: 18/725,895

(22) PCT Filed: May 25, 2021

(86) PCT No.: PCT/CN2021/095765

§ 371 (c)(1),
(2) Date: Jul. 1, 2024

(87) PCT Pub. No.: WO2022/083119

PCT Pub. Date: Apr. 28, 2022

(65) Prior Publication Data

US 2025/0335257 A1 Oct. 30, 2025

(30) Foreign Application Priority Data

Oct. 21, 2020 (CN) ........................ 202011134276.0

(51) Int. Cl.
*G06F 9/46* (2006.01)
*G06F 9/50* (2006.01)

(52) U.S. Cl.
CPC .......... *G06F 9/5038* (2013.01); *G06F 9/5044* (2013.01)

(58) Field of Classification Search
CPC .... G06F 9/5038; G06F 9/5044; G06F 9/5011; G06F 9/505; G06F 9/5033; G06F 9/5027;
(Continued)

(56) References Cited

U.S. PATENT DOCUMENTS 5,392,430 A * 2/1995 Chen ...................... G06F 8/451
707/999.003
7,328,316 B2 * 2/2008 Moir ...................... G06F 9/526
711/147

(Continued)

FOREIGN PATENT DOCUMENTS

CN 104216764 A * 12/2014
CN 105843679 A 8/2016

(Continued)

*Primary Examiner* — Hiren P Patel
*Assistant Examiner* — Zhi Chen
(74) *Attorney, Agent, or Firm* — IPRTOP LLC

(57) ABSTRACT

A resource allocation method, a medium and a server are provided. The resource allocation method includes: obtaining tasks executable by the server as first tasks; obtaining first data processing models each corresponding to one of the first tasks, wherein each of the first data processing models includes one or more operators; performing a resource allocation on each operator in each of the first data processing models to obtain a quantity of resource used by the operator; and obtaining second tasks when the server receives a task request from a user, wherein the second tasks include current tasks of the server and tasks corresponding to the task request from the user; when the number of the second tasks is greater than one, a coordinated resource allocation sub-method is executed. The resource allocation method described in the present disclosure can be applied to complex scenarios involving multiple data processing models.

10 Claims, 8 Drawing Sheets

(58) Field of Classification Search
CPC .... G06F 9/5061; G06F 9/5077; G06F 9/4881; G06F 9/5083; G06F 9/5094; H04L 67/1097; H04L 41/0836
See application file for complete search history.

(56) References Cited

U.S. PATENT DOCUMENTS

| | | | | |
|---|---|---|---|---|
| 11,783,256 | B1 * | 10/2023 | Hernandez | G06Q 10/06316 705/7.38 |
| 2001/0044818 | A1 * | 11/2001 | Liang | H04L 67/56 709/201 |
| 2003/0061264 | A1 * | 3/2003 | Benhase | G06F 9/505 718/105 |
| 2004/0015510 | A1 * | 1/2004 | Moir | G06F 9/526 |
| 2010/0169618 | A1 * | 7/2010 | Ramalingam | G06F 8/456 712/E9.004 |
| 2015/0095521 | A1 * | 4/2015 | Hackborn | G06F 11/328 710/18 |
| 2016/0125118 | A1 * | 5/2016 | Chaudhuri | G06F 30/34 716/101 |
| 2018/0143858 | A1 * | 5/2018 | Sanjabi | G06F 9/5061 |
| 2018/0300381 | A1 * | 10/2018 | Horowitz | G06F 16/258 |
| 2018/0365066 | A1 * | 12/2018 | Zeng | G06F 1/329 |
| 2019/0391853 | A1 | 12/2019 | Cilfone et al. | |
| 2021/0096915 | A1 * | 4/2021 | Patel | G06F 9/4887 |
| 2021/0286654 | A1 * | 9/2021 | Liu | G06F 9/52 |
| 2022/0121903 | A1 * | 4/2022 | Zhang | G06F 15/80 |
| 2024/0054384 | A1 * | 2/2024 | Catron | G06F 9/5061 |

FOREIGN PATENT DOCUMENTS

| | | | | | |
|---|---|---|---|---|---|
| CN | 106712981 | A | * | 5/2017 | |
| CN | 107992359 | A | * | 5/2018 | G06F 9/5038 |
| CN | 109684088 | A | | 4/2019 | |
| CN | 109947619 | A | | 6/2019 | |
| CN | 111736987 | A | | 10/2020 | |
| CN | 111752716 | A | * | 10/2020 | G06N 20/00 |
| CN | 112199196 | | | 1/2021 | |
| JP | H0287232 | A | * | 3/1990 | |

* cited by examiner

RESOURCE ALLOCATION METHOD, MEDIUM, AND SERVER

FIELD OF THE INVENTION

The present disclosure relates to the technical field of resource allocation, and in particular, to a resource allocation method, a medium and a server.

BACKGROUND OF THE INVENTION

With the rapid advancement of deep learning, users' expectations for high-performance cloud services have also risen. As deep learning tasks become increasingly diverse and data processing models more complex, and with the growing number of users, deep learning services face greater challenges. To meet the resource demands of complex scenarios involving multiple tasks, models, and users, many chip manufacturers provide specialized deep learning chips with high computational power, along with corresponding programming frameworks for deep learning service providers. These providers may also combine multiple chips. However, existing resource allocation methods primarily optimize performance for a single data processing model, making it difficult to apply them effectively in complex scenarios involving multiple data processing models.

SUMMARY OF THE INVENTION

In view of the above-mentioned shortcomings, the present disclosure provides a resource allocation method, a medium, and a server, which solve the problem that current resource allocation methods primarily optimize performance for a single data processing model, making it difficult to apply them effectively in complex scenarios involving multiple data processing models.

A first aspect of the present disclosure provides a resource allocation method. The resource allocation method is applied to a server with a multi-core architecture and includes: obtaining tasks executable by the server as first tasks; obtaining first data processing models each corresponding to one of the first tasks, wherein each of the first data processing models includes one or more operators; performing a resource allocation on each operator in each of the first data processing models to obtain a quantity of resource used by the operator; and obtaining second tasks when the server receives a task request from a user, wherein the second task includes a current task of the server and a task corresponding to the task request from the user; when the number of the second tasks is greater than one, a coordinated resource allocation sub-method is executed; wherein the coordinated resource allocation sub-method includes: obtaining second data processing models each corresponding to one of the second tasks; obtaining a quantity of resource used by each operator in each of the second data processing models based on the quantity of resource used by each operator in each of the first data processing models; obtaining a scheduling sequence and a parallel execution state for each operator in each of the second data processing models; and allocating resources of the server based on the quantity of resource, scheduling sequence, and parallel execution state for each operator in each of the second data processing model.

In an embodiment of the first aspect, the obtaining of the quantity of resource used by each operator in each of the first data processing models includes: allocating different potential resource quantities for the operator, respectively, and obtaining an operator performance for each of the potential resource quantities; obtaining the quantity of resource used by the operator based on the operator performance corresponding to each of the potential resource quantities.

In an embodiment of the first aspect, the resource allocation method further includes: performing operator fusion and/or operator slicing on each operator in each of the first data processing models based on the quantity of resource used by the operator.

In an embodiment of the first aspect, the obtaining of the scheduling sequence for each operator in each of the second data processing models includes: obtaining a performance model for each operator in each of the second data processing models, wherein the performance model includes an execution time of the operator; obtaining a service quality requirement for each of the second tasks; and obtaining the scheduling sequence for each operator in each of the second data processing models based on the service quality requirement for each of the second tasks and the performance model.

In an embodiment of the first aspect, after obtaining the parallel execution state for each operator in each of the second data processing models, the coordinated resource allocation sub-method further includes: obtaining an interference model between operators in each of the second data processing models; adjusting, based on the interference model, the scheduling sequence and the parallel execution state for each of the operators in each of the second data processing models.

In an embodiment of the first aspect, after obtaining the scheduling sequence and the parallel execution state for each of the operators in each of the second data processing models, the coordinated resource allocation sub-method further includes: obtaining a resource utilization status of the server based on the quantity of resource, scheduling sequence, and parallel execution state for each of the operators in each of the second data processing models; adjusting the quantity of resource used by at least one operator in each of the second data processing models based on the resource utilization status of the server.

In an embodiment of the first aspect, the obtaining of the second tasks includes: stopping a currently executed resource allocation scheme; obtaining unfinished tasks and unfinished sub-tasks from the current tasks of the server; and configuring the tasks corresponding to the task request from the user, the unfinished tasks, and the unfinished sub-tasks as the second tasks.

In an embodiment of the first aspect, the resource allocation method is executed in units of kernels of the server.

A second aspect of the present disclosure provides a non-transitory computer-readable storage medium configured to store a computer program. The resource allocation method described in the first aspect of the present disclosure is implemented when the computer program is executed by a processor.

A third aspect of the present disclosure provides a server. The server is configured with a multi-core architecture and includes: a memory, on which a computer program is stored; a processor, communicatively connected to the memory and configured to call the computer program to perform the resource allocation method described in the first aspect of the present disclosure; and a display, communicatively connected to the processor and the memory, for displaying a graphics user interface associated with the resource allocation method.

As described above, the present disclosure has the following advantages:

When the server needs to execute two or more second tasks based on user requests, the resource allocation method can be used to obtain the second data processing models corresponding to each of the second tasks. It also retrieves the scheduling sequence and the parallel execution state for each operator in each of the second data processing models. Based on this, the resources of the server are allocated to all operators within the second data processing models. Therefore, it is evident that the resource allocation method described in this disclosure is applicable to complex scenarios involving multiple data processing models.

REFERENCE NUMERALS

100 Server
110 Memory
120 Processor
130 Display
S11~S15 Steps S11 to S15
S151~S154 Steps S151 to S154
S131~S132 Steps S131 to S132
S51~S53 Steps S51 to S53
S61~S62 Steps S61 to S62
S71~S72 Steps S71 to S72
S141~S143 Steps S141 to S143
S91~S99 Steps S91 to S99

DETAILED DESCRIPTION OF THE INVENTION

The embodiments of the present disclosure will be described below. Those skilled can easily understand advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure. It should be noted that the following embodiments and the features of the following embodiments can be combined with each other if no conflict will result.

It should be noted that the drawings provided in this disclosure only illustrate the basic concept of the present disclosure in a schematic way, so the drawings only show the components closely related to the present disclosure. The drawings are not necessarily drawn according to the number, shape and size of the components in actual implementation; during the actual implementation, the type, quantity and proportion of each component can be changed as needed, and the components' layout may also be more complicated. In addition, in this document, relationship terms such as "first", "second", etc. are used only to distinguish one entity or operation from another, and do not necessarily require or imply any such actual relationship or sequence between these entities or operations.

Figure 1:
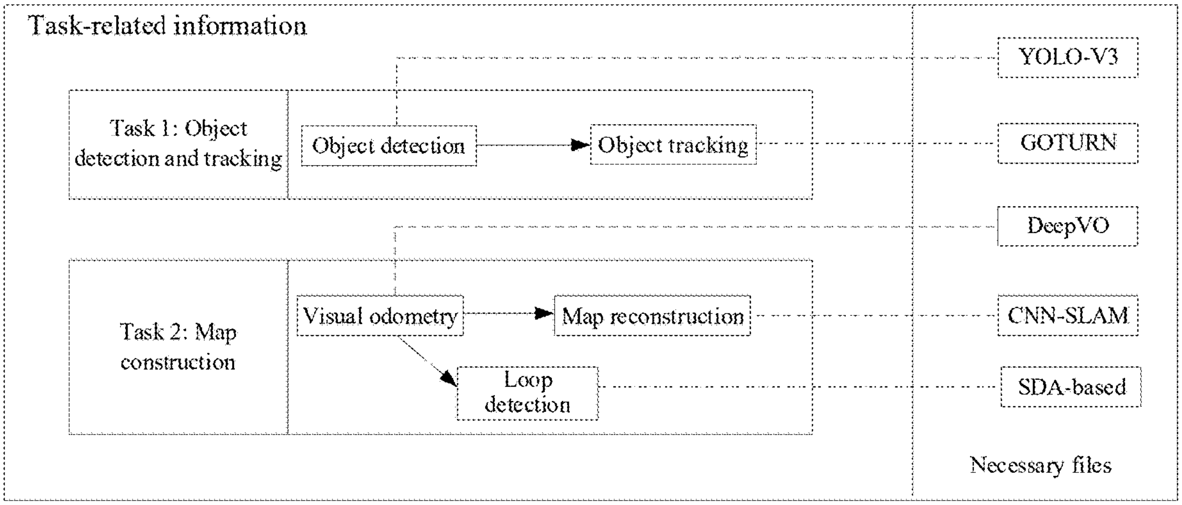
FIG. 1 shows task-related information and files required for tasks, both of which are obtained by a resource allocation method in one embodiment of the present disclosure.

When a server provides services to users, users send task requests to the server, and the server responds to these requests and executes the corresponding tasks. Specifically, users may send multiple task requests to the server. Each task request corresponds to one task, which may contain several sub-tasks. Each sub-task is associated with one or more data processing models and task files. Additionally, each data processing model includes one or more operators. For example, referring to FIG. 1, task 1 involves an object detection sub-task and an object tracking sub-task. The object detection sub-task corresponds to a YOLO-V3 model, while the object tracking sub-task corresponds to a GOTURN model. Each of the YOLO-V3 and GOTURN models consist of multiple operators, such as convolutional operators, pooling operators, and fully connected operators.

In practical applications, as the number of users sending task requests to the server increases and/or the number of requested tasks grows, the overall number of data processing models also increases. Consequently, scenarios with multiple users, multiple tasks, and/or multiple data processing models can ultimately be seen as complex scenarios involving multiple data processing models. Managing such complex scenarios significant challenges for resource allocation on the server. However, the inventors have observed that traditional resource allocation methods primarily focus on optimizing performance for a single data processing model, making it difficult to apply them effectively to complex scenarios involving multiple data processing models.

To address this issue, the present disclosure provides a resource allocation method applied to a server with a multi-core architecture. Specifically, when the server needs to execute two or more second tasks based on user requests, the resource allocation method can be used to obtain second data processing models each corresponding to one of the second tasks. It also retrieves a scheduling sequence and parallel execution state for each operator in each of the second data processing models. Based on this, the resources of the server are allocated to all operators within the second data processing models. Therefore, it is evident that the resource allocation method described in this disclosure is applicable to complex scenarios involving multiple data processing models.

Figure 2A:
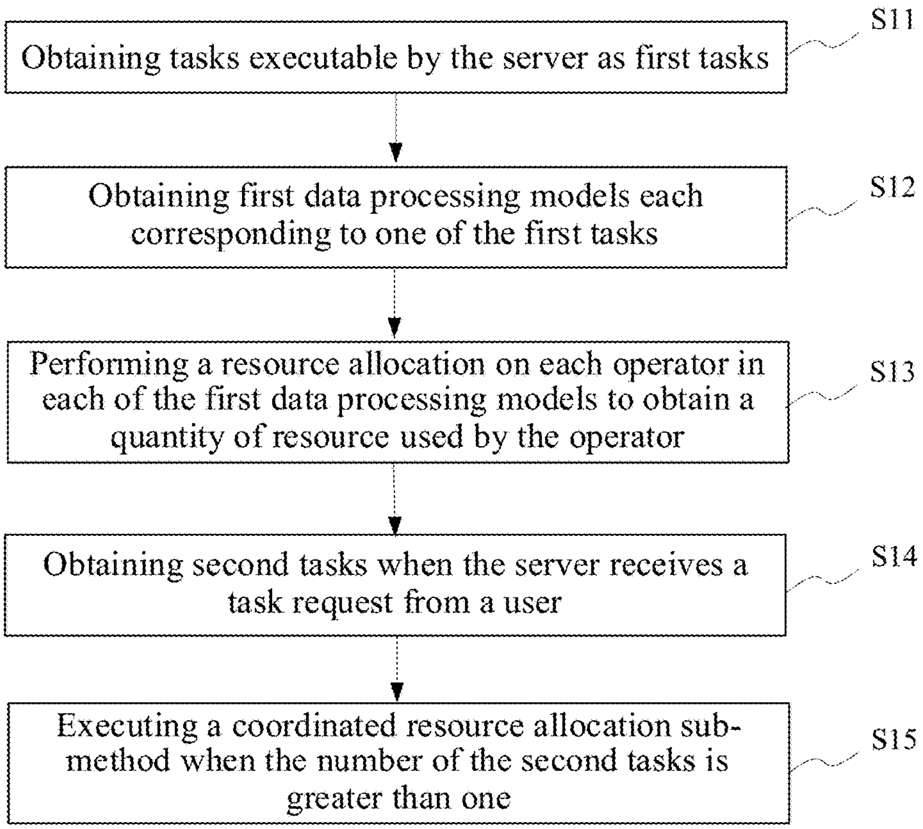
FIG. 2A shows a flowchart of a resource allocation method in one embodiment of the present disclosure.

In an embodiment of the present disclosure, the resource allocation method is applied to a server with a multi-core architecture. Referring to FIG. 2A, the resource allocation method includes steps S11 to S15.

S11: obtaining tasks executable by the server as first tasks. The first tasks are associated with services that the server can offer to users. Since the server provides a set of predefined services, the tasks executable by the server can be directly determined, and the first tasks can be further determined. For example, if a server is capable of providing services such as object detection and tracking, as well as map building, then the tasks executable by the server includes both object detection and tracking tasks, and map construction tasks.

S12: obtaining first data processing models each corresponding to one of the first tasks, wherein each of the first data processing models includes one or more operators. Specifically, the resource allocation method of the present disclosure is primarily designed for cloud service scenarios involving multiple users and data processing models. In such scenarios, there is a wealth of task-related information available as prior information that can be obtained before the server receives the user requests. The task-related information includes details such as logical structures, model architectures, operator types, and parameters of the first tasks, enabling step S12 to obtain the corresponding first data processing model based on the task-related information. For example, referring to FIG. 1, if the first tasks include task 2, the task-related information of the task 2 will be as follows: the task 2 is named as map construction, its logical structures include visual odometry, map reconstruction, and loop detection, its data processing models include DeepVO models, CNN-SLAM models, and SDA-based models, and its operators' types and parameters can be directly obtained based on the data processing models.

S13: performing a resource allocation on each operator in each of the first data processing models to obtain a quantity of resource used by the operator. The resources of the server can include storage resources, computational resources, and more. Specifically, an algorithm of the resource allocation is executed in units of kernels to allocate the resources of the server, at which time, the quantity of resource used by each operator can be represented by the number of the kernels used by the operator. For example, the resource used by operator 1 includes eight kernels, while the resource used by operator 2 includes sixteen kernels, and so forth.

The above steps S11-S13 are typically performed before runtime (compilation phase). Once these steps are completed, the server can begin providing services to users. Subsequently, users can request the server to execute the corresponding task by sending task requests.

S14: obtaining second tasks when the server receives a task request from a user. The second tasks include current tasks of the server and tasks corresponding to the task request from the user. The current tasks of the server include both tasks that are being executed and tasks that have not yet been executed. Therefore, the second tasks encompass the following: the tasks corresponding to the task request from the user, the tasks that are currently being executed by the server, and the tasks that have not yet been executed by the server (pending tasks). In some embodiments, there are more than one such task requests, and the task requests may originate from the same user or from multiple users. In particular, when the server is in an idle state, the second tasks include only the tasks corresponding to the task request(s) from the user.

S15: when the number of the second tasks is greater than one, a coordinated resource allocation sub-method is executed to obtain a resource allocation scheme of the server. In addition, when there is only one second task, mutual interactions between different tasks will not be considered during the resource allocation, at which time, the allocating of the resources of the server includes: obtaining operators contained in a data processing model corresponding to the second task; for any one of the operators, allocating certain resources of the server to the operator based on the quantity of the resource used by the operator.

Figure 2B:
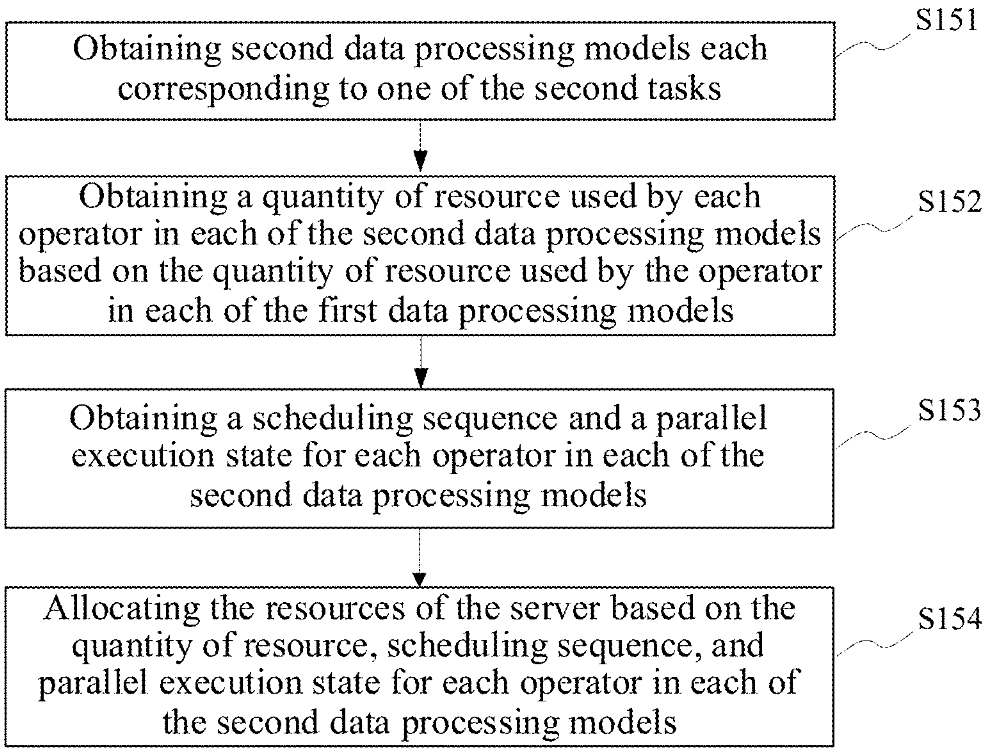
FIG. 2B shows a flowchart of step S15 of the resource allocation method shown in FIG. 2A.

Specifically, referring to FIG. 2B, the coordinated resource allocation sub-method includes steps S151 to S154.

S151: obtaining second data processing models each corresponding to one of the second tasks.

S152: obtaining a quantity of resource used by each operator in each of the second data processing models based on the quantity of resource used by the operator in each of the first data processing models. Since the second tasks are those that the user has requested the server to perform, and the first tasks are executable by the server, each of the second tasks is included in the first tasks. Consequently, the quantity of resource used by each operator in each of the second data processing models can be obtained based on the quantity of resource used by each operator in each of the first data processing models.

Figure 2C:
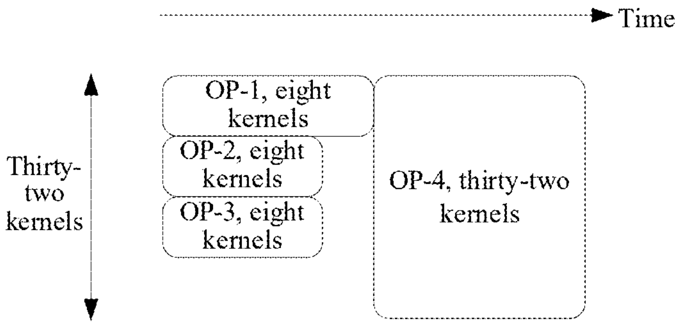
FIG. 2C shows a schematic diagram of a resource allocation scheme obtained by a resource allocation method in one embodiment of the present disclosure.

S153: obtaining a scheduling sequence and a parallel execution state for each operator in each of the second data processing models. Specifically, due to dependencies between operators and maximum available resources of the server, certain operators in each of the second data processing models, such as operators OP-1 and OP-4 in FIG. 2C, need to be executed one after another over time. The scheduling sequence is configured to dictate an execution sequence of the operators. Additionally, when the server has sufficient resources, two or more operators, such as operators OP-1, OP-2, and OP-3 in FIG. 20, may be executed in parallel (that is, execute simultaneously) to improve performance. For each of the operators, its parallel execution state indicates whether the operator can be executed in parallel with other operators, and/or the number and name of those concurrent operators.

S154: allocating the resources of the server based on the quantity of resource, scheduling sequence, and parallel execution state for each operator in each of the second data processing models, so as to generate the resource allocation scheme of the server. Specifically, after the scheduling sequence and the parallel execution state for each operator in each of the second data processing models are determined, in combination with the quantity of resource used by each operator, the resources of the server can be allocated through S153. For example, if the resource used by operators OP-1, OP-2, OP-3, and OP-4 includes eight kernels, eight kernels, eight kernels, and thirty-two kernels, respectively, the execution sequence is to execute operators OP-1, OP-2, and OP-3 first, then execute operator OP-4, and the operators OP-1, OP-2, and OP-3 can be executed in parallel. If the server has a total of thirty-two kernels, based on the above information, the server can simultaneously allocate eight kernels to the operators OP-1, OP-2, and OP-3, and after the operators OP-1, OP-2, and OP-3 are all executed, the server allocates thirty-two kernels to the operator OP-4, thereby completing the resource allocation of the server.

When the server needs to execute two or more second tasks based on user requests, the resource allocation method can obtain the second data processing models corresponding to each of the second tasks. It also retrieves the scheduling sequence and the parallel execution state for each operator in each of the second data processing models. Based on this information, the resources of the server are allocated to all operators within the second data processing models. Therefore, it is evident that the resource allocation method described in this disclosure is applicable to complex scenarios involving multiple data processing models.

According to the above description, it can be seen that steps S11-S13 focus on the resource allocation for operators within a single data processing model, where the mutual interactions between different tasks will not be considered, making steps S11-S13 a single-task resource allocation phase. Steps S14-S15 deal with the resource allocation for operators across at least two data processing models, where the mutual interactions between different tasks need to be considered, making steps S14-S15 a multi-task coordinated resource allocation phase.

Compared to the optimization of a single data processing model, traditional multiple data processing models pose significant challenges in areas such as data reuse, operator-level shared resource preemption, and sequencing of service operations. By contrast, the resource allocation method of the present disclosure operates at the model level, allowing it to gather more prior information, ensuring a better service assurance rate and lower energy consumption.

Moreover, the operational models of GPUs/TPUs differ greatly from those of multi-core architecture chips, and traditional schemes mainly address resource allocation for heterogeneous clusters like CPU+GPU/CPU+TPU, focusing on the overlap of compute-memory operations on GPUs/TPUs, multi-core architectures require additional considerations, such as kernel allocation and operator pipeline execution, which leads to imperfect support of these resource allocation schemes on multi-core architectures. In comparison, the resource allocation method of the present disclosure allocates server kernels based on the scheduling sequence and parallel execution states of the operators, and thus fully take into the account kernel allocation and operator pipeline execution. As a result, the resource allocation method of the present disclosure is well-suited for servers with multi-core architectures.

Figure 3:
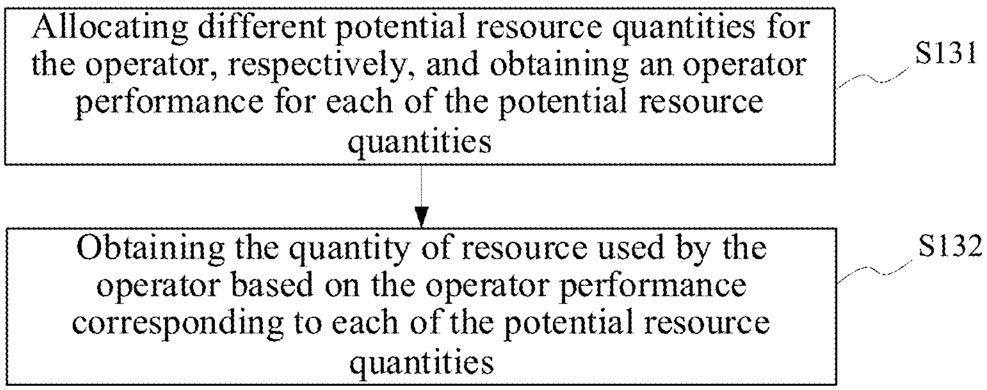
FIG. 3 shows a flowchart of step S13 of the resource allocation method shown in FIG. 2A.

In an embodiment of the present disclosure, since the first tasks, first data processing models, and each operator in each of the first data processing models are all prior information, the quantity of resource used by each operator in each of the first data processing models can be obtained through performance testing. Specifically, referring to FIG. 3, the obtaining of the quantity of resource used by each operator in each of the first data processing models through performance testing includes steps S131 to S132.

S131: allocating different potential resource quantities for the operator, respectively, and obtaining an operator performance for each of the potential resource quantities. The operator performance needs to take into account both the execution time of the operator and the quantity of resource used by the operator, so as to use resources as efficiently as possible while still meeting service quality requirements. Typically, the operator performance can be quantified by multiplying the execution time of the operator by the quantity of resource used by the operator. Specifically, the operator performance for each of the potential resource quantities can be obtained by actually executing the operator with the corresponding quantity of resource. For example, the operator can be allocated with one kernel, two kernels, . . . , up to thirty-two kernels. When the operator is allocated with one kernel, an operator performance associated with one-kernel allocation can be obtained by executing the operator. Similarly, when the operator is allocated with two kernels, an operator performance associated with two-kernel allocation can be obtained by executing the operator, and so forth.

S132: obtaining the quantity of resource used by the operator based on the operator performance corresponding to each of the potential resource quantities. Preferably, one of the potential resource quantities associated with an optimal operator performance is selected as the quantity of resource used by the operator. For example, if the optimal operator performance is realized when allocating eight kernels to the operator, the resource used by the operator includes eight kernels.

In the present disclosure, the resource allocation method mainly targets servers with multi-core architecture, as well as specialized deep learning chips contained therein. It takes advantage of the fact that operators without data dependencies can share kernel resources, the quantity of resource used by each operator in each of the first data processing models is obtained through performance testing, ensuring that each operator adopts the most economical resource allocation, which not only enables the operator to achieve acceptable performance, but also minimizes resource consumption, thereby leaving more available resources for other operators.

In an embodiment of the present disclosure, after obtaining the quantity of resource used by each operator in each of the first data processing models, the resource allocation method further includes: performing a graph-level optimization on each operator in each of the first data processing models based on the quantity of resource used by the operator. The graph-level optimization includes operator fusion and/or operator slicing.

Figure 4:
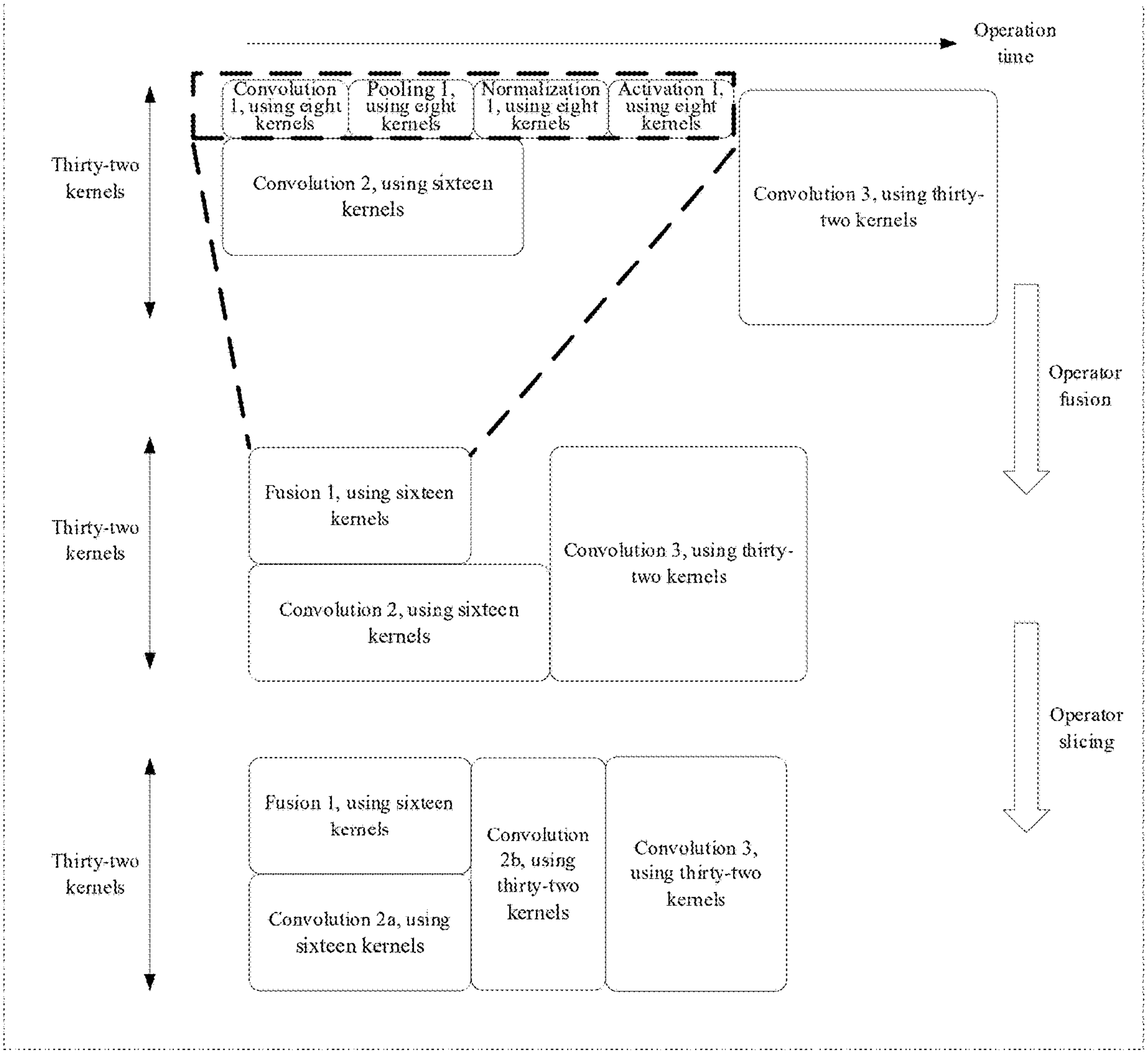
FIG. 4 shows a schematic diagram of performing an operator fusion and operator slicing by a resource allocation method in one embodiment of the present disclosure.

Specifically, the operator fusion refers to fusing, in the first data processing models, several consecutive operators that use fewer resources and belong to the same task, within the limitations of the maximum available resources of the server. Two or more operators can be fused into one operator through the operator fusion. The operator fusion increases parallelism, thereby reducing access overhead by streaming the execution. For example, referring to FIG. 4, an operator convolution 1, pooling 1, normalization 1, and activation 1 are four consecutive operators that each use eight kernels and belong to the same task. These four consecutive operators can be fused into one operator by operator fusion during graph-level optimization and use sixteen kernels in total for operation. It can be seen that the parallelism can be increased and the access overhead can be reduced by the operator fusion.

The operator slicing refers to slicing an operator with a long running time (or, long operation) into two or more operators within the limitations of the maximum available resources of the server and without affecting the operator performance. The sliced operator is able to provide higher flexibility in the multi-task coordinated resource allocation phase due to its smaller scheduling granularity. For example, referring to FIG. 4, an operator convolution 2 uses sixteen kernels and runs for a long time. During the operator slicing, the operator convolution 2 can be sliced into two operators: one still using sixteen kernels (convolution 2a) and another using thirty-two kernels (convolution 2b), based on the kernel availability of the server.

Based on the above description, it can be seen that the resource allocation method of the present disclosure performs the graph-level optimization on each operator in each of the first data processing models, offering more flexibility, higher parallelism, and lower access overhead for the resource allocation of the operator. Moreover, by combining the operator fusion and the operator slicing, the hardware idling and resource wastage caused by running time and resource utilization status during the resource allocation can be effectively cut down, and the wasted portion of hardware resources can be effectively filled up, boosting overall performance.

Figure 5:
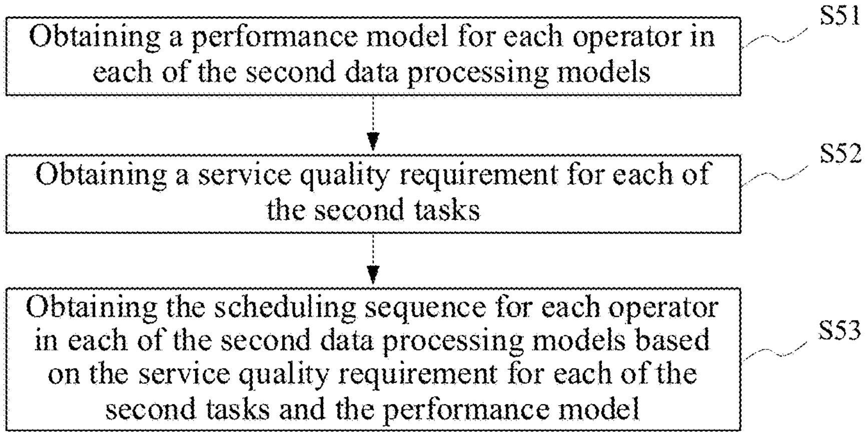
FIG. 5 shows a flowchart of obtaining a scheduling sequence of operators by a resource allocation method in one embodiment of the present disclosure.

In an embodiment of the present disclosure, referring to FIG. 5, the obtaining of the scheduling sequence for each operator in each of the second data processing models includes steps S51 to S53.

S51: obtaining a performance model for each operator in each of the second data processing models. The performance model includes an execution time of the operator and can be obtained through performance testing. Specifically, during the compilation phase, the operators are executed with different configurations, and the performance model of each operator is constructed based on parameters such as the execution time of the operator. In addition, in actual operation, the performance model can be updated in real time based on the actual operation of the operator, so as to improve the accuracy of the performance model and allows for further optimized resource allocation.

S52: obtaining a service quality requirement for each of the second tasks. The service quality requirement may be obtained from the task request of the user.

S53: obtaining the scheduling sequence for each operator in each of the second data processing models based on the service quality requirement for each of the second tasks and the performance model. For example, operators in tasks with lower service quality requirements can be intentionally delayed in execution, so as to prioritize the resources of the server for operators in tasks with higher service quality requirements. In addition, the scheduling sequence for each operator in each of the second data processing models may be considered in combination with the execution time of the operator and the service quality requirement for each of the second tasks.

Figure 6A:
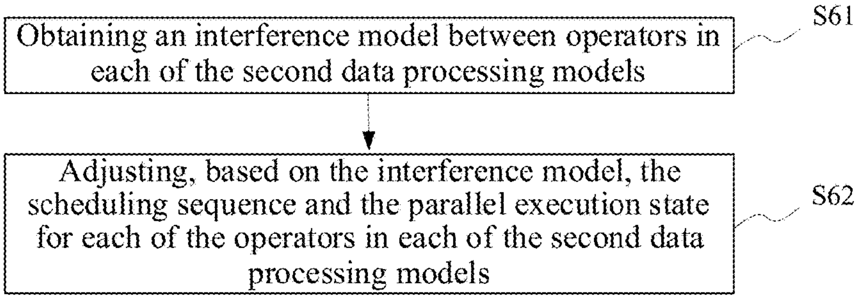
FIG. 6A shows a flowchart of adjusting a scheduling sequence and parallel execution state of operators by a resource allocation method in one embodiment of the present disclosure.

In an embodiment of the present disclosure, when operators in different tasks are executed simultaneously (i.e., when operators in different tasks are executed in parallel), the operators interfere with operators in other tasks and result in performance degradation due to resource sharing (such as caches, bandwidth, etc.). In cases where interference is severe, the parallel execution time of two operators may exceed the serial execution time of these two operators, resulting in worse performance. To address this issue, referring to FIG. 6A, after obtaining the parallel execution state for each operator in each of the second data processing models, the coordinated resource allocation sub-method further includes steps S61 to S62.

Figure 6B:
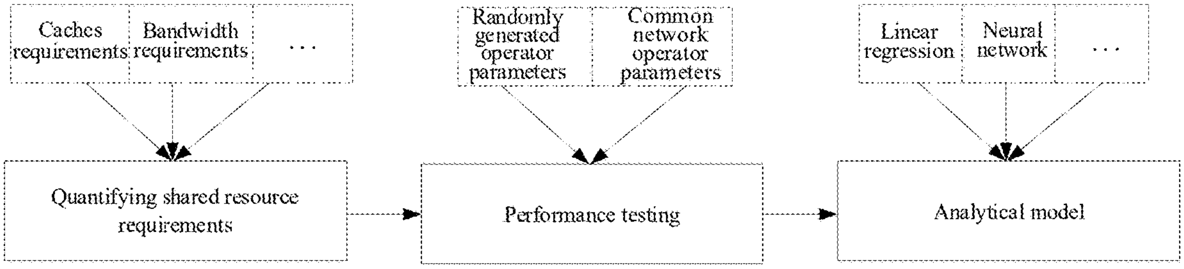
FIG. 6B shows a flowchart of obtaining an interference model by a resource allocation method in one embodiment of the present disclosure.

S61: obtaining an interference model between operators in each of the second data processing models. Referring to FIG. 6B, the interference model is constructed by quantifying shared resource requirements, performance testing, and building an analytical model. Specifically, the quantifying of the shared resource requirements refers to quantifying the resources that are required to be shared between operators, such as caches, bandwidth, etc. During the performance testing, the operator performance can be tested utilizing randomly generated operator parameters and/or common network operator parameters. That is, the operators are executed with different operator parameters to obtain their corresponding operator performance and the interference status between the operators. In the building of the analytical model, linear regression models and neural network models can be employed to model the interference status between the operators, obtaining the interference model between the operators in each of the second data processing models.

S62: adjusting, based on the interference model, the scheduling sequence and the parallel execution state for each of the operators in each of the second data processing models. Specifically, when two operators are executed in parallel, if the interference between the two is high, the two operators are adjusted to be executed serially by performing S62, and the scheduling sequence of the two operators is adjusted based on their performance models and/or service quality requirements. For example, if the operator 1 and the operator 2 are executed in parallel and the interference between them is shown to be high based on the interference model, the operator 1 and the operator 2 are then adjusted to be executed serially, and the scheduling sequence is also changed.

The resource allocation method of the present disclosure is capable of adjusting the scheduling sequence and the parallel execution state for each operator in each of the second data processing models based on the interference model, which helps minimize or even eliminate interference introduced by parallel execution between operators in different tasks, ultimately enhancing the accuracy of resource allocation.

Figure 7A:
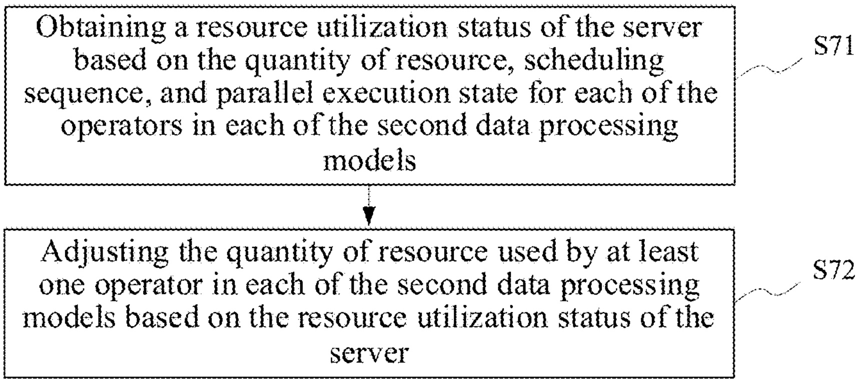
FIG. 7A shows a flowchart of adjusting resource quantities used by operators through a resource allocation method in one embodiment of the present disclosure.

In an embodiment of the present disclosure, as shown in FIG. 7A, after obtaining the scheduling sequence and the parallel execution state for each of the operators in each of the second data processing models, the coordinated resource allocation sub-method further includes steps S71-S72, so as to prevent hardware resource waste caused by resource occupation and scheduling sequence in certain scenarios.

S71: obtaining a resource utilization status of the server based on the quantity of resource, scheduling sequence, and parallel execution state for each of the operators in each of the second data processing models. The resource utilization status of the server includes whether there are idle resources and the number of those idle resources. For example, in FIG. 7B, the operators OP-1, OP-2, and OP-3 are executed in parallel with each other, and are executed serially with the operator OP-4 before adjustment, at which time, the server includes eight idle kernels.

Figure 7B:
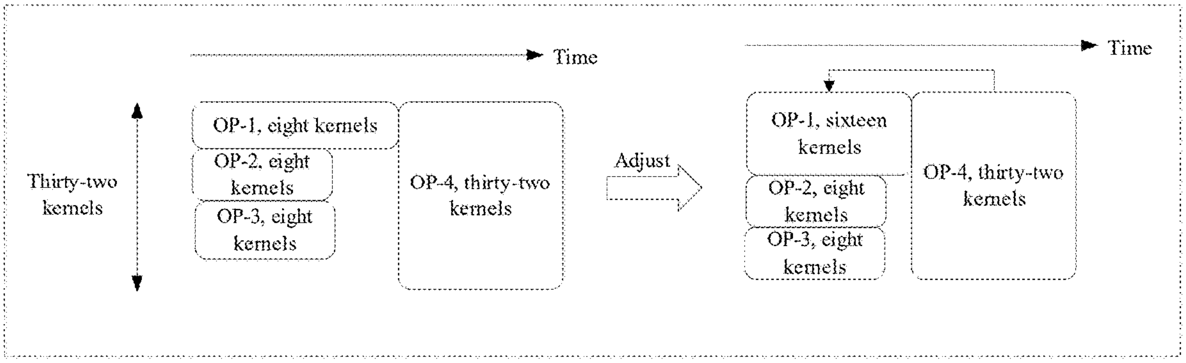
FIG. 7B shows a schematic diagram of adjusting resource quantities used by operators through a resource allocation method in one embodiment of the present disclosure.

S72: adjusting the quantity of resource used by at least one operator in each of the second data processing models based on the resource utilization status of the server. Specifically, if the server has one or more idle resources at a certain moment, the idle resources are allocated to one or more operators being executed at that moment by step S72. As shown in FIG. 7B, the server includes eight idle kernels, and these eight idle kernels can be allocated to the operator OP-1 to be used in step S72.

The resource allocation method of the present disclosure is capable of adjusting the quantity of resource used by at least one operator in each of the second data processing models based on the resource utilization status of the server, thereby minimizing or even eliminating the waste of hardware resources triggered by resource utilization and scheduling sequence.

Figure 8:
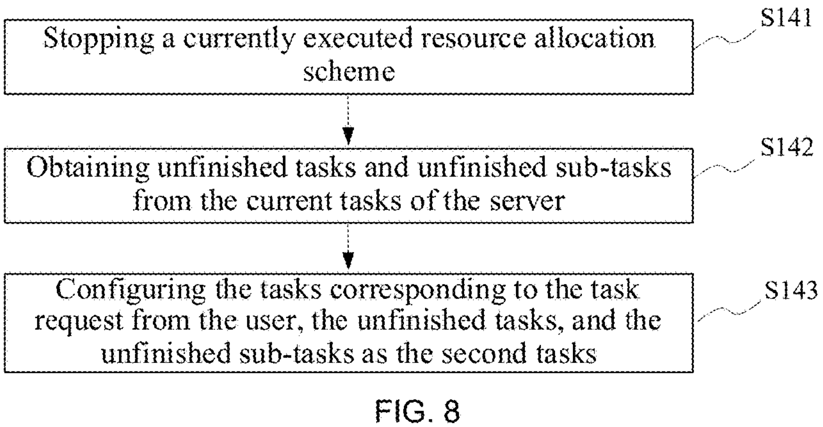
FIG. 8 shows a flowchart of step S14 of the resource allocation method shown in FIG. 2A.

For the server, due to the large number of users, diverse service types, and the inability of the server to accurately predict the arrival time of task requests, it is not feasible to statically enumerate all possible scenarios and provide an optimal resource allocation scheme. Therefore, the server needs to dynamically respond to task requests of users at runtime. To achieve this purpose, in an embodiment of the present disclosure, referring to FIG. 8, when the server receives the task request from the user, the obtaining of the current tasks of the server and tasks corresponding to the task request as the second tasks includes steps S141-S143.

S141: stopping a currently executed resource allocation scheme. The currently executed resource allocation scheme is generated based on a previously received task request by the server. By performing S141, the resource allocation method of the present disclosure discards the currently executed resource allocation scheme when the server receives a new task request.

S142: obtaining unfinished tasks and unfinished sub-tasks from the current tasks of the server. The current tasks of the server include both tasks that are being executed and tasks that have not yet been executed. The unfinished tasks refer to tasks that have not yet been executed by the server, while the unfinished sub-tasks refer to tasks that are currently being executed but have not been completed, or task that have not yet started.

S143: configuring the tasks corresponding to the task request from the user, the unfinished tasks, and the unfinished sub-tasks as the second tasks. Thereafter, the coordinated resource allocation sub-method is executed based on the second tasks, thereby generating a new resource allocation scheme.

In an embodiment of the present disclosure, since the resource allocation method is mainly oriented to a server with a multi-core architecture, the structure of its tasks (including sub-tasks in the tasks and logical dependencies) can be determined once the type of service is determined. Thus, the task request from the user can be responded in real time during the operation of the server.

In an embodiment of the present disclosure, after the allocation of the resources of the server is completed, the resource allocation method further includes: when codes are generated and then compiled into an executable session, a programming model of the specialized deep learning chips is configured to support just-in-time (JIT) compilation, and the resource allocation, scheduling sequence, and parallel execution state are dynamically adjusted based on the actual operation of the operator.

In an embodiment of the present disclosure, the resource allocation method is executed in units of kernels of the server. At this time, the resource for each operator includes kernels of integer numbers.

Figure 9:
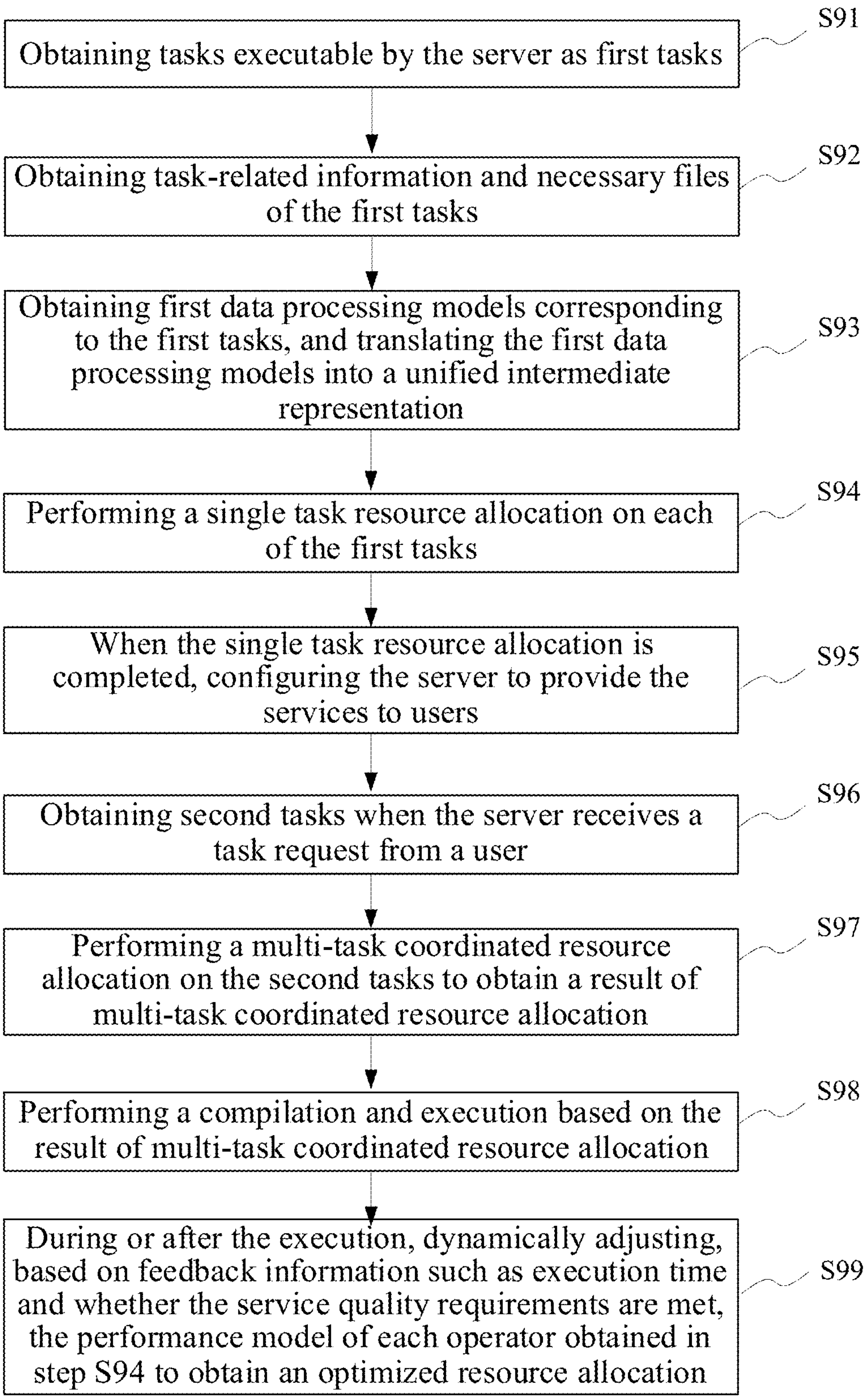
FIG. 9 shows a flowchart of another resource allocation method in one embodiment of the present disclosure.

In an embodiment of the present disclosure, the resource allocation method is applied to the server with the multi-core architecture, and the resources of the server are allocated in units of kernels. The resource allocation method of the present disclosure is primarily designed for cloud service scenarios involving multiple users and data processing models. In such scenarios, the task requests are relatively large in granularity and contain significant prior information. Therefore, the resource allocation method of the present disclosure is capable of fully utilizing the prior information. The prior information includes the logical structures, model architectures, operator types, parameters, and more. During compilation, each model is optimized, and the interference between operators is modeled. As a result, when the server receives multiple task requests, a resource allocation scheme that outperforms independently optimizing each of several data processing models can be generated. Specifically, referring to FIG. 9, the resource allocation method includes steps S91 to S99.

S91: obtaining tasks executable by the server as first tasks.

S92: obtaining task-related information and necessary files of the first tasks. The task-related information and the necessary files are configured as prior information during the compilation phase.

S93: obtaining first data processing models corresponding to the first tasks, and translating the first data processing models into a unified intermediate representation. Usually, the server supports multiple data processing models, and therefore the data processing models need to be converted into a unified intermediate model.

S94, performing a single task resource allocation on each of the first tasks. The single task resource allocation can be performed before runtime (compilation phase). The single task resource allocation aims to minimize the average resource utilization while satisfying service quality requirements. Specifically, the single task resource allocation performs the graph-level optimization (including operator fusion and operator slicing) on the quantity of resource used by each operator in an optimized multi-core architecture model to generate an optimized resource allocation. The optimized resource allocation can be used during multi-model coordinated resource allocation phase. Additionally, the performance model of each operator in each of the first data processing models is constructed during the single task resource allocation, which can be subsequently utilized in the multi-model coordinated resource allocation phase.

S95: when the single task resource allocation is completed, configuring the server to provide the services to users.

S96: obtaining second tasks when the server receives a task request from a user. The second tasks include current tasks of the server and tasks corresponding to the task request from the user. Each of the second tasks is included in the first tasks, and the task requests includes the service quality requirement for each of the second tasks.

S97: performing a multi-task coordinated resource allocation on the second tasks to obtain a result of multi-task coordinated resource allocation. Specifically, step S94 aims to obtain the optimal resource allocation for each of the data processing models while meeting the service quality requirements. To ensure the service quality in the case of multiple models sharing hardware resources, step S94 takes into account the scheduling sequence and interference of the operators. The single task resource allocations obtained in step S94 are combined to generate an overall resource allocation, maximizing the number of tasks that meet the service quality requirements.

S98: performing a compilation and execution based on the result of multi-task coordinated resource allocation.

S99: during or after the execution, dynamically adjusting, based on feedback information such as execution time and whether the service quality requirements are met, the performance model of each operator obtained in step S94 to obtain an optimized resource allocation.

In addition, for task requests arriving at the server in real time, the resource allocation method of the present disclosure is configured to: discard the currently executed resource allocation scheme when the server receives a new task request, and perform a coordinated optimization by combining the remaining portion of original tasks with the new task request, thereby generating the new resource allocation scheme.

During the single task resource allocation, due to different operator types and parameters, the computational intensity and hardware resource requirements of the resource allocation method may vary. Specifically, operators that require less computation can face issues if they are allocated excessive resources. This can lead to a mismatch between computation and memory access, and increase communication overheads. Therefore, allocating more resources to these operators may not significantly enhance their performance. In fact, it could potentially lead to a performance decline. To address this issue, the performance testing is employed for each operator during the single task resource allocation to obtain the most economical resource allocation.

Moreover, the graph-level optimization used in step S94 provides higher flexibility, parallelism, and reduced access overhead during the single task resource allocation. Specifically, after the quantity of resource of each operator is determined, step S94 is performed to identify consecutive operators with fewer kernels for fusion, such that the parallelism can be increased by streaming the execution. Step S94 is also configured to slice the operator with a long running time into two or more operators with fewer kernels without affecting the operator performance. As the sliced operators have smaller scheduling granularity, they can provide higher flexibility for multi-task coordinated resource allocation. Thus, the graph-level optimization effectively utilizes previously wasted resources, enhancing resource allocation performance.

Furthermore, during the transition from single task resource allocation to multi-task coordinated resource allocation, interference exists between operators of different data processing models, which significantly impacts system performance. Different operators have varying resource requirements. For example, storage-intensive operators demand high bandwidth, while compute-intensive operators rely on on-chip cache. To mitigate this issue, the quantification-performance testing shown in steps S61-S62 is employed to construct and analyze the models, and the interference between operators with different types and parameters is analyzed to determine the parallel execution mode for certain models, minimizing the impact of interference. If parallel execution of two or more operators takes longer than serial execution, these operators will preempt the shared resources, leading to a counterproductive situation. The interference model effectively avoids such a situation. Additionally, considering interference, the multi-task coordinated resource allocation is capable of taking into account the service quality requirements, and optimally adjusting the scheduling sequence of operators in different models, thereby maximizing the proportion of tasks meeting service quality requirements.

Based on the above description of the resource allocation method, the present disclosure further provides a non-transitory computer-readable storage medium having a computer program stored thereon. The resource allocation method of the present disclosure is implemented when the computer program is executed by a processor.

Figure 10:
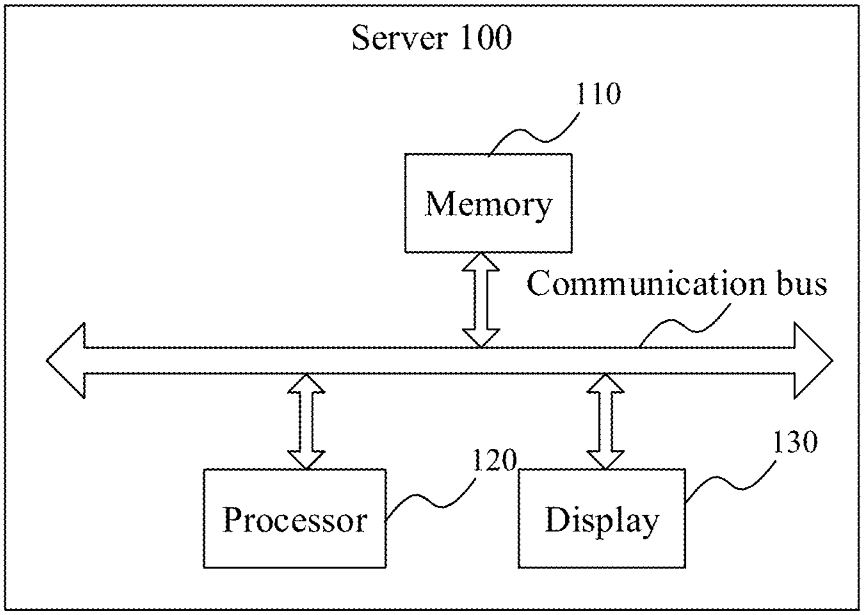
FIG. 10 shows a schematic structural diagram of a server in one embodiment of the present disclosure.

Based on the above description of the resource allocation method, the present disclosure further provides a server. The server has a multi-core architecture. Referring to FIG. 10, in an embodiment of the present disclosure, the server 100 includes: a memory 110 storing a computer program; a processor 120, communicatively connected to the memory 110 and configured to call the computer program to perform the resource allocation method of the present disclosure; and a display 130, communicatively connected to the memory 110 and the processor 120, for displaying an interactive graphics user interface associated with the resource allocation method.

The scope of the resource allocation method as described in the present disclosure is not limited to the sequence of operations listed. Any scheme realized by adding or subtracting operations or replacing operations of the traditional techniques according to the principle of the present disclosure is included in the scope of the present disclosure.

The resource allocation method of the present disclosure is primarily designed for cloud service scenarios involving multiple users and multiple data processing models, and optimizes the compilation and resource allocation of the specialized deep learning chips with multi-core architectures. The resource allocation method of the present disclosure is able to dynamically allocate resources based on real-time information from the data processing models, thereby improving overall service quality, meeting service requirements, and minimizing system energy consumption. When multiple users provide task-related information, service requirements, and necessary files, the resource allocation method optimizes resource allocation for single tasks and multi-tasks by considering hardware characteristics in sequence. Ultimately, it generates executable service sessions to serve the users.

Existing research on service scheduling primarily focuses on maximizing the satisfaction rate of delay-sensitive services and optimizing hardware utilization. To achieve this, real-time and cost-effective scheduling algorithms are designed, considering resource sharing between services and task execution order. Unlike existing methods, the resource allocation method of the present disclosure takes into account the need to satisfy user requirements as much as possible when providing services for multiple users and tasks. This objective is the most straightforward objective. The resource allocation method of the present disclosure formulates this objective as a dual objective: minimizing resource utilization for each task and across all tasks, while ensuring that user-defined service quality requirements are met. This dual objective covers a wide range of scenarios. When quantifying resource utilization, the resource allocation method of the present disclosure calculates the average resource consumption for each task based on the resource utilization and execution duration of operators within those tasks. Ultimately, the optimization objective of the present disclosure is to minimize the total average resource utilization across all tasks while guaranteeing that service quality requirements are met and that the resource consumption by operators within each task does not exceed the maximum available resources.

When the server needs to execute two or more second tasks based on user requests, the resource allocation method can obtain the second data processing models each corresponding to one of the second tasks. It also retrieves the scheduling sequence and the parallel execution state for each operator in each of the second data processing models. Based on this information, the resources of the server are allocated to all operators within the second data processing models. Therefore, it is evident that the resource allocation method described in this disclosure is applicable to complex scenarios involving multiple data processing models.

The present disclosure effectively overcomes various shortcomings and a has high industrial value.

The above-mentioned embodiments are merely illustrative of the principle and effects of the present disclosure instead of restricting the scope of the present disclosure. Any person skilled in the art may modify or change the above embodiments without violating the principle of the present disclosure. Therefore, all equivalent modifications or changes made by those who have common knowledge in the art without departing from the spirit and technical concept disclosed by the present disclosure shall be still covered by the claims of the present disclosure.

The invention claimed is:

1. A resource allocation method, applied to a server with a multi-core architecture, wherein the method includes:

obtaining tasks executable by the server as first tasks;

obtaining first data processing models each corresponding to one of the first tasks, wherein each of the first data processing models includes one or more operators;

performing a resource allocation on each operator in each of the first data processing models to obtain a quantity of resource used by each operator by:

sequentially allocating different potential resource quantities in units of kernels of the server ranging from 1 kernel to a preset maximum kernel quantity to each operator;

for each potential resource quantity allocated, executing each operator and obtaining an operator performance corresponding to the potential resource quantity, wherein the operator performance is quantified by a product of an execution time and the potential resource quantity allocated;

selecting the potential resource quantity corresponding to a minimum operator performance as the quantity of resource used by each operator; and obtaining second tasks in response to receiving, by the server, a task request from a user, wherein the second tasks include current tasks of the server and tasks corresponding to the task request from the user;

wherein the second tasks include a plurality of tasks; and executing a coordinated resource allocation sub-method for the plurality of tasks, wherein the coordinated resource allocation sub-method includes:

obtaining second data processing models each corresponding to one of the second tasks;

obtaining a quantity of resource used by each operator in each of the second data processing models based on the quantity of resource used by each operator in each of the first data processing models;

obtaining an initial scheduling sequence and an initial parallel execution state for each operator in each of the second data processing models;

obtaining an interference model between operators of the second data processing models;

adjusting, based on the interference model, the initial scheduling sequence and the initial parallel execution state for each of the operators in each of the second data processing models to obtain an adjusted scheduling sequence and an adjusted parallel execution state, wherein the adjusting includes:

quantifying shared resource requirements between operators of the second data processing models;

performing performance testing on the operators using randomly generated operator parameters, common network operator parameters, or both;

recording an interference status between operators executed in parallel;

building the interference model using linear regression models or neural network models; and identifying, based on the interference model, two operators having high interference and setting the adjusted parallel execution state such that the two operators are executed serially; and allocating resources of the server based on the quantity of resource used by each operator, the adjusted scheduling sequence, and the adjusted parallel execution state for each operator in each of the second data processing models.

2. The resource allocation method according to claim 1, further including:

performing operator fusion or operator slicing on each operator in each of the first data processing models based on the quantity of resource used by each operator in each of the first data processing models.

3. The resource allocation method according to claim 1, wherein the obtaining of the initial scheduling sequence for each operator in each of the second data processing models includes:

obtaining a performance model for each operator in each of the second data processing models, wherein the performance model includes an execution time of the operator;

obtaining a service quality requirement for each of the second tasks; and obtaining the initial scheduling sequence for each operator in each of the second data processing models based on the service quality requirement for each of the second tasks and the performance model.

4. The resource allocation method according to claim 1, wherein the coordinated resource allocation sub-method further includes:

obtaining a resource utilization status of the server based on the quantity of resource used by each operator, the adjusted scheduling sequence, and the adjusted parallel execution state for each of the operators in each of the second data processing models;

adjusting the quantity of resource used by at least one operator in each of the second data processing models based on the resource utilization status of the server.

5. The resource allocation method according to claim 1, the obtaining of the second tasks includes:

stopping a currently executed resource allocation scheme;

obtaining unfinished tasks and unfinished sub-tasks from the current tasks of the server; and configuring the tasks corresponding to the task request from the user, the unfinished tasks, and the unfinished sub-tasks as the second tasks.

6. The resource allocation method according to claim 1, wherein the resource allocation method is executed in units of kernels of the server.

7. The resource allocation method according to claim 2, the operator slicing comprises:

identifying an operator in the first data processing models whose running time exceeds a preset threshold as a long-running operator;

slicing the long-running operator into two or more sub-operators within a maximum available resource limit of the server and without affecting an overall performance of the first data processing models; and allocating resource quantities to each of the sub-operators based on a current kernel availability of the server.

8. The resource allocation method according to claim 4, wherein adjusting the quantity of resource used by the at least one operator in each of the second data processing models based on the resource utilization status of the server comprises:

monitoring, in real time, the resource utilization status of the server to calculate a quantity of idle kernels; and allocating the idle kernels to operators currently being executed.

9. A non-transitory computer-readable storage medium, configured to store a computer program, wherein the resource allocation method according to claim 1 is implemented when the computer program is executed by a processor.

10. A server with a multi-core architecture, including:

a memory, on which a computer program is stored;

a processor, communicatively connected to the memory and configured to call the computer program to perform the resource allocation method according to claim 1; and a display, communicatively connected to the processor and the memory, for displaying a graphics user interface associated with the resource allocation method.

* * * * *